United States Patent [19]

Benjamin et al.

[11] Patent Number: 5,462,503
[45] Date of Patent: Oct. 31, 1995

[54] INTERACTIVE EXERCISE APPARATUS

[75] Inventors: Michael H. Benjamin, Quincy; Aaron F. Bobick; Harvey A. Koselka, both of Newton; W. Thatcher Ulrich, Boston, all of Mass.

[73] Assignee: CyberGear, Inc., Cambridge, Mass.

[21] Appl. No.: 375,166

[22] Filed: Jan. 18, 1995

Related U.S. Application Data

[63] Continuation of Ser. No. 12,305, Feb. 2, 1993, abandoned.

[51] Int. Cl.$^6$ ........................................... A63B 69/00
[52] U.S. Cl. ................... 482/4; 434/61; 482/54; 482/57; 482/72; 482/901; 482/902
[58] Field of Search .................. 482/1–9, 51, 54, 482/57, 61, 68, 72, 900–902; 434/61

[56] References Cited

U.S. PATENT DOCUMENTS

| | | |
|---|---|---|
| 3,686,776 | 8/1972 | Dahl . |
| 3,722,884 | 3/1973 | Brown . |
| 3,767,195 | 10/1973 | Dimick . |
| 3,903,613 | 9/1975 | Bisberg . |
| 4,049,262 | 9/1977 | Cunningham, Jr. . |
| 4,141,630 | 2/1979 | Emmons . |
| 4,196,528 | 4/1980 | Foerst . |
| 4,358,105 | 11/1982 | Sweeney, Jr. . |
| 4,418,911 | 12/1983 | Bowers et al. . |
| 4,461,470 | 7/1984 | Astroth et al. . |
| 4,464,117 | 8/1984 | Foerst . |
| 4,478,407 | 10/1984 | Manabe . |
| 4,512,567 | 4/1985 | Phillips . |
| 4,527,980 | 7/1985 | Miller . |
| 4,542,897 | 9/1985 | Melton et al. . |
| 4,572,509 | 2/1986 | Sitrick . |
| 4,616,829 | 10/1986 | Smack, Sr. et al. . |
| 4,630,817 | 12/1986 | Buckley . |
| 4,637,605 | 1/1987 | Ritchie . |
| 4,709,917 | 12/1987 | Yang . |
| 4,710,129 | 12/1987 | Newman et al. . |
| 4,711,447 | 12/1987 | Mansfield et al. . |
| 4,720,789 | 1/1988 | Hector et al. . |
| 4,771,394 | 9/1988 | Cavanagh . |
| 4,786,049 | 11/1988 | Lautenschlager . |
| 4,817,938 | 4/1989 | Nakao et al. . |
| 4,817,939 | 4/1989 | Augspurger et al. . |
| 4,860,763 | 8/1989 | Schminke . |
| 4,887,966 | 12/1989 | Gellermann . |
| 4,887,967 | 12/1989 | Letovsky et al. . |
| 4,891,748 | 1/1990 | Mann . |
| 4,925,183 | 5/1990 | Kim . |
| 4,932,651 | 6/1990 | Defaux . |
| 4,938,475 | 7/1990 | Sargeant et al. . |
| 5,031,900 | 7/1991 | Leask . |
| 5,031,901 | 7/1991 | Saarinen . |
| 5,031,902 | 7/1991 | Findlay . |
| 5,051,638 | 9/1991 | Pyles . |
| 5,072,929 | 12/1991 | Peterson et al. . |
| 5,240,417 | 8/1993 | Smithson et al. ................ 482/902 X |

FOREIGN PATENT DOCUMENTS

| | | |
|---|---|---|
| 0028209 | 6/1981 | European Pat. Off. . |
| 0354785 | 2/1990 | European Pat. Off. . |
| 9216659 U | 7/1992 | Germany . |
| 2194369 | 3/1988 | United Kingdom . |
| WO87/00066 | 1/1987 | WIPO . |

OTHER PUBLICATIONS

Search Rpt., Feb. 2, 1994, PCT.

*Primary Examiner*—Richard J. Apley
*Assistant Examiner*—Glenn E. Richman
*Attorney, Agent, or Firm*—Testa, Hurwitz & Thibeault

[57] ABSTRACT

An interactive exercise apparatus engages a user's mind and body. The apparatus comprises a support structure for supporting a user. An exercise mechanism and a steering mechanism are proximal to the support structure. A simulated environment is generated by a computer and displayed on a display system. The user manipulates the exercise mechanism and the steering mechanism to freely navigate through the simulated environment. The computer monitors the exercise mechanism and the steering mechanism to determine user position in the simulated environment. The display is periodically updated by the computer to provide a continuous visual display of the user's position as the user travels through the simulated environment.

12 Claims, 7 Drawing Sheets

INTERACTIVE EXERCISE APPARATUS

This is a continuation of application Ser. No. 08/012,305 filed on Feb. 2, 1993, now abandoned.

FIELD OF THE INVENTION

This invention relates generally to exercise equipment, specifically to exercise cycles.

BACKGROUND OF THE INVENTION

It is known that physical fitness is of prime importance to many people. Historically, people have been able to maintain an acceptable level of fitness simply due to their everyday lives. As lifestyles have become progressively more sedentary, people have been forced to seek exercise in other ways.

A portion of society keeps in shape by participating in group exercise events such as tennis, hockey or basketball games. Such games are forms of "fun exercise" in that participants often take part in such events because they simply enjoy the games or the competition and not solely for the purpose of fitness. However, it is often difficult to coordinate the people and facilities required for many recreational and team sports. Individual sports such as bicycling, running and swimming are a viable alternative in that they allow for flexible schedules. The disadvantages to these sports is that they are location and weather dependent.

A large segment of society finds it easier and more convenient to go to health clubs or to use home exercise equipment to exercise. Health clubs have extended hours and a wide range of fitness equipment that allows workout schedules to be flexible and workouts to be quick. Unfortunately, current exercise equipment makes working out a chore that is tolerated due to the importance of cardiovascular (aerobic) fitness.

Exercise equipment generally falls into two categories: strength and aerobic. Strength equipment include traditional free weights as well as machines on which the weight is not directly attached to the lifting bars. The user lifts the weights in different ways to strengthen various muscle groups. Aerobic machines improve the users cardiovascular system and tone muscles rather than building muscles and strength. Aerobic equipment includes exercise cycles, treadmills and stair climbers. Typically, the required speed or resistance can be varied during a workout. A control panel equipped with a set of light emitting diodes (LED's) may be provided to depict the routine as a histogram. An average workout lasts approximately 20 minutes. Biomechanical feedback such as calories burned may also be displayed on the control panel.

The most conventional ways to exercise often are not necessarily the most fun. Thus, a need exists for fun exercise equipment which makes workouts more enjoyable and entices more people to exercise.

SUMMARY OF THE INVENTION

An object of the present invention is to provide exercise equipment which makes aerobic exercise less boring and more fun. To accomplish this, the present invention utilizes digital graphics, interactive software, a mechanism for aerobic exercise, steering controls and a display system to provide exercise equipment which is competitive, engaging and fun. The graphics, interactive software and display engage a user mentally while the exercise and steering mechanisms control engage the user physically. As such, a workout with the exercise equipment of the present invention can be as exciting as participating in team sports but with health club or home convenience.

In one embodiment, the present invention is directed to an exercise apparatus comprising a support structure for supporting a user. The support structure can include a bicycle seat or a bucket seat such that the apparatus resembles an exercise cycle. An exercise mechanism, such as a pair of cycling pedals, can be initiated by the user for providing aerobic exercise. A steering mechanism, such as a pair of handles, is disposed proximal to the support structure. The exercise apparatus further comprises a processor which generates an interactive simulated environment and a display system spaced from the user providing a visual display of the simulated environment.

During a workout, the user manipulates the exercise mechanism and the steering mechanism to freely navigate through the simulated environment. The processor monitors the exercise mechanism and the steering mechanism to determine user position in the simulated environment. The display is updated by the processor to provide a continuous visual display of the user's position as the user navigates substantially unrestricted through the simulated environment.

The processor is capable of running many different programs to provide a variety of simulated environments. Some programs provide roads, terrain, obstacles for the user and competition. Other programs may provide new worlds for the user to explore or even allow the user to travel across the solar system. Each program provides a simulated environment which can be multi-dimensional to appear more realistic. The user views the simulated environment or world through the display system. The user freely navigates through the environment using the exercise mechanism and the steering mechanism. In other words, user travel in the simulated environment is substantially unrestricted. Thus, the user can travel across roads and trails or chose to travel across grass, water or other more challenging terrain.

A user operating the exercise apparatus of the present invention manipulates the exercise mechanism and steering mechanism. The exercise mechanism may comprise a pair of interconnected cycling pedals. Further, instead of employing a traditional flywheel and freewheel to provide for pedal resistance, a closed loop digital control system may be used to electronically control pedaling revolutions. The control system includes a digital controller which controls a pedal resistance device electronically, thereby emulating a flywheel/freewheel to provide the proper combination of pedal resistance and inertia for smooth pedaling revolutions.

The steering mechanism may be coupled to a stationary base by a mechanical linkage. As the user manipulates the steering mechanism, the mechanical linkage causes tilting of the user relative to the base. This feature simulates the turning action of a bicycle or the like, serving to further engage the user in the exercising experience. In fact, the frame can tilt up to 15 degrees or more to either side of a longitudinal vertical plane.

BRIEF DESCRIPTION OF THE DRAWINGS

The foregoing and other objects, features and advantages of the invention will become apparent from the following more particular description of preferred embodiments of the invention, as illustrated in the accompanying drawings in which like reference characters refer to the same parts throughout the different views. The drawings are not necessarily to scale, emphasis instead being placed on illustrating the principles of the present invention.

DETAILED DESCRIPTION OF THE INVENTION

Figure 1:
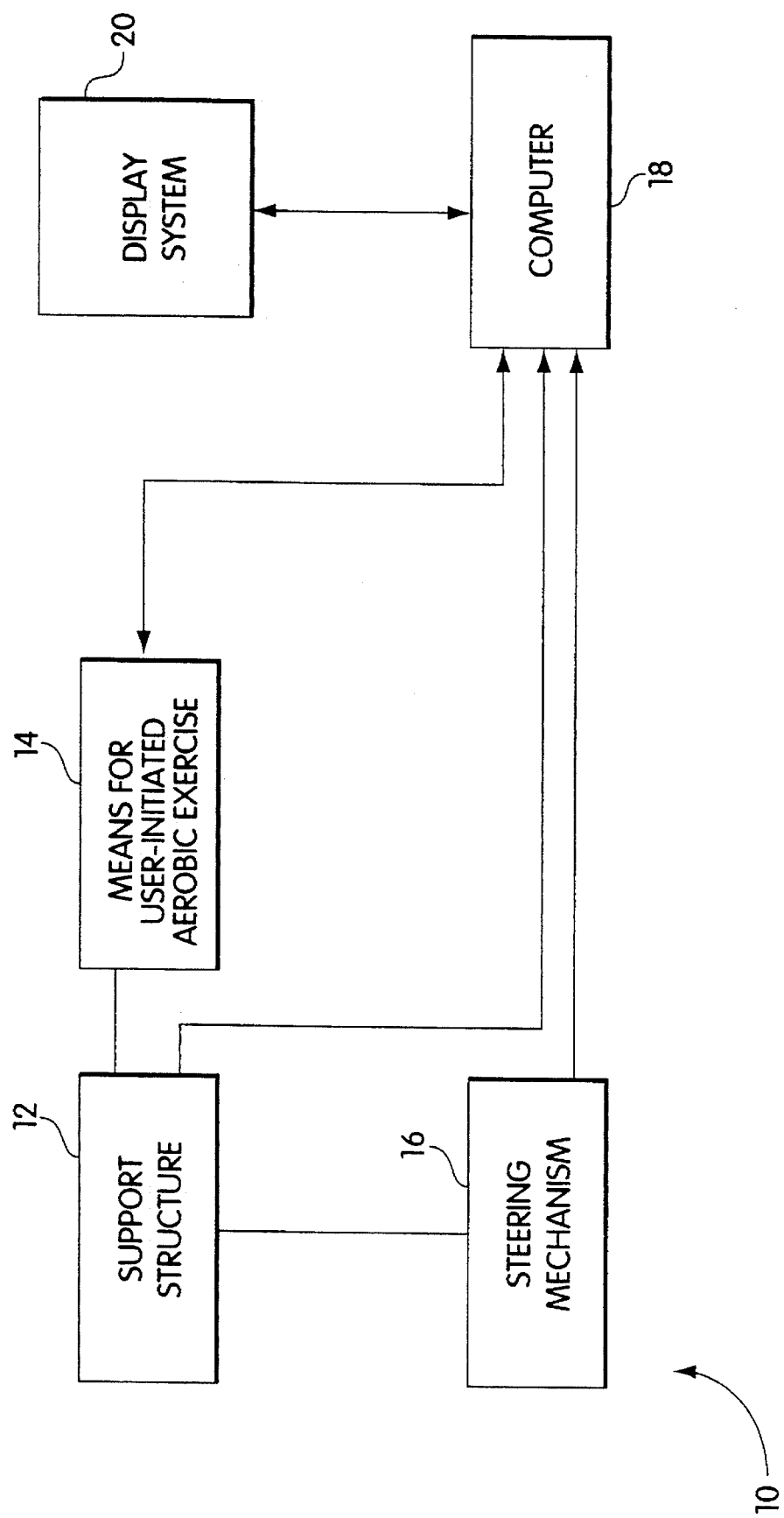
FIG. 1 is a block diagram of an interactive exercise apparatus illustrating the principles of the present invention.

The present invention is generally directed to interactive exercise equipment which engages a user's mind and body. Referring to FIG. 1, an exercise device 10 comprises a support structure 12 for supporting a user. The support structure 12 may include a bicycle seat or bucket seat. An exercise mechanism 14 for providing aerobic exercise to a user, such as cycling pedals, is proximal to the support structure 12. A steering mechanism 16, such as handles or handlebars, is also positioned near the support structure 12.

An interactive simulated environment is generated by a processor 18, such as a computer, and displayed on a display system 20. The display system comprises a viewing screen or multiple viewing screens to provide a wider field of view. The user manipulates the exercise mechanism 14 and/or the steering mechanism 16 to freely navigate through the environment displayed on the display. To accomplish this, the processor 18 monitors the exercise mechanism 14 and the steering mechanism 16 to determine user position in the simulated environment. The processor 18 controls the level of difficulty of the exercise mechanism 14 to simulate characteristics (i.e. topography, terrain, etc.) of the environment. The display 20 is periodically updated by the computer 18 to provide a continuous visual display of the user's position as the user travels substantially unrestricted in the simulated environment.

Figure 2A:
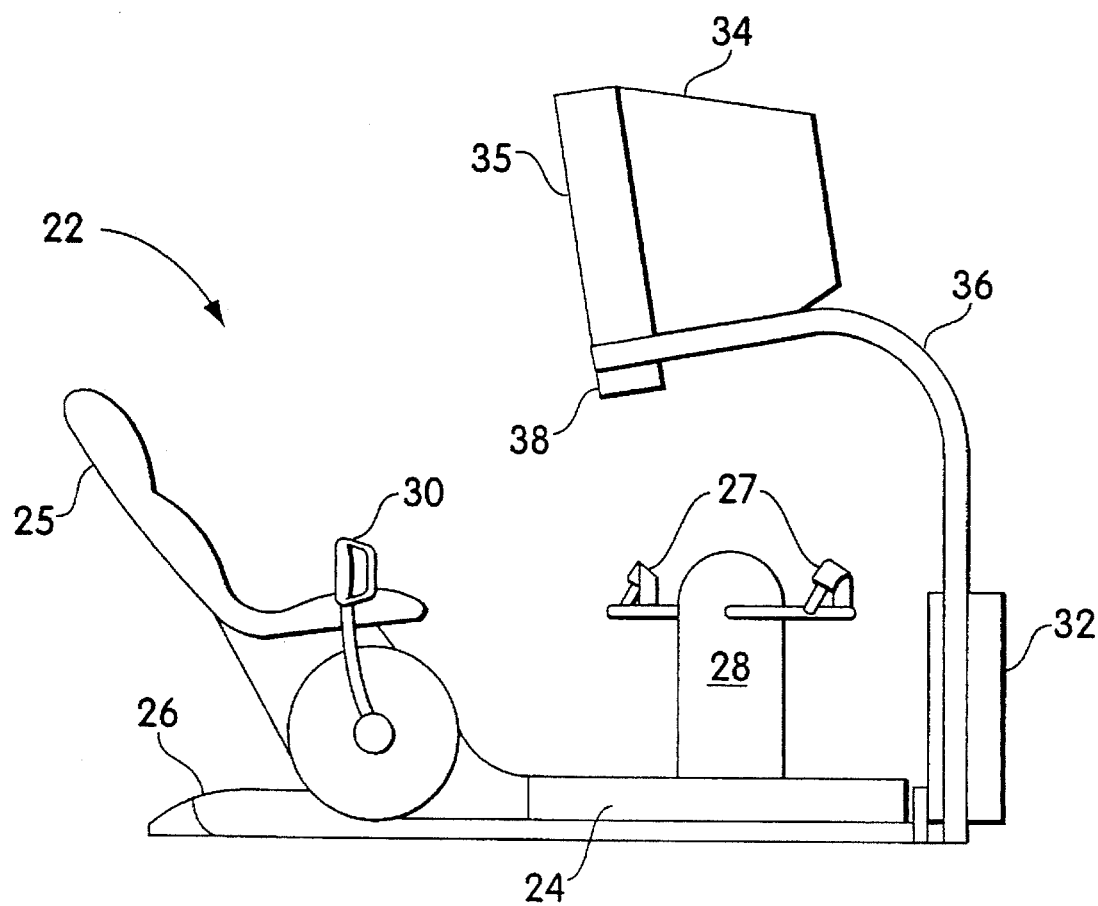
FIG. 2A is a side view of an interactive exercise cycle of the present invention.

In one embodiment, the present invention is directed to an exercise cycling apparatus as shown in FIG. 2A. The apparatus 22 includes a frame 24 movably mounted to a stationary base 26. A bucket seat 25 is mounted to the frame 24. The seat 25 enables a user to be seated in the recumbent position which provides several biomechanical and aerobic advantages. Recumbent cycling engages the gluteus maximus, the largest muscle group, to provide for maximum aerobic activity before reaching the anaerobic threshold. The bucket seat 25 makes the recumbent position very comfortable for long rides. In addition, the recumbent position is less intimidating to overweight users. It is noted, however, that the present invention can employ the more common upright exercise bicycle frame and seat without departing from the scope of the invention.

A pair of cycling pedals 27 extend from a pedal resistance device 28. The pedal resistance device 28 is adjustable so that the pedals 27 can always be within reach of a short or long-legged user. A user exercises by manipulating the pedals 27. Two vertically oriented handles 30 are coupled by a mechanical linkage 72 (see FIG. 5) to the frame 24 for steering the cycle 22. The handles 30 are positioned so that one handle is located on each side the seat 25. As the user manipulates the handles 24, the mechanical linkage cause tilting of the frame 24 relative to the base 26. This feature simulates the turning action of a bicycle and is explained in detail below.

A computer 32 capable of generating an interactive simulated environment is mounted to an L-shaped leg 36 which extends from the stationary base 26. The computer 32 can be powered by many different types of microprocessor based computers. One embodiment of the invention includes a personal computer based on the Intel 486 processor. Other computers, such as those based on the Motorola 68040 processor can be used.

A viewing screen, such as a television monitor 35, is positioned opposite the seat 25 and oriented to be viewed by a seated user. The monitor 35 may be capable of showing computer generated graphics as well as standard TV and VCR images. The monitor 35 is connected to the computer 32 to provide a visual (and optional audio) display of the simulated environment. While the monitor 35 can be any size, a larger monitor is preferred. A variable speed fan 38 is mounted adjacent to the monitor 35. The computer 32 regulates the speed of the fan 38 to provide an air flow which simulates wind speed.

Figure 2B:
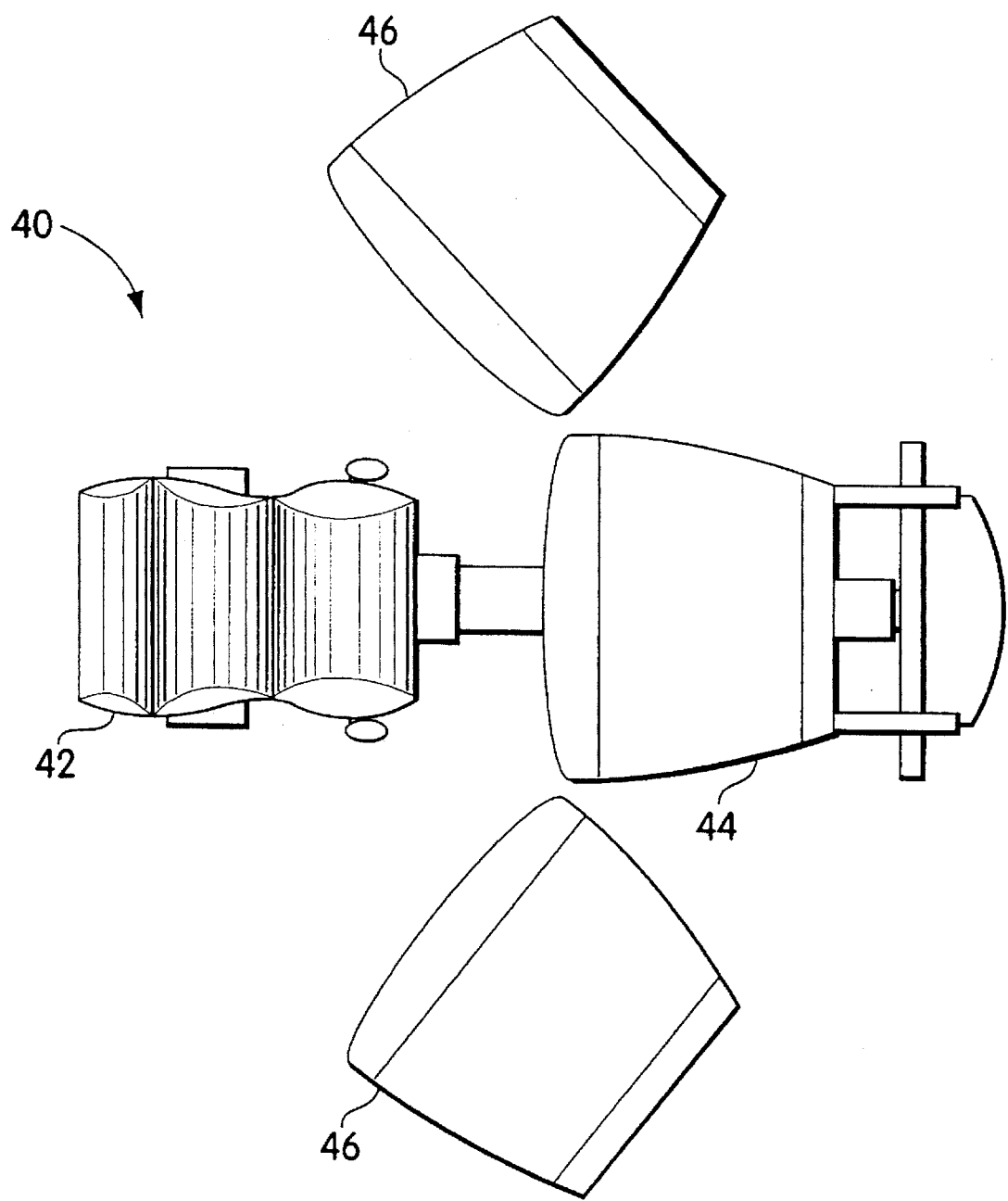
FIG. 2B is a top view of an alternative interactive exercise cycle which includes a plurality of visual display units.

Referring to FIG. 2B, a central viewing monitor 44 and two side monitors 46 can be employed. The two side monitors 46 provide peripheral vision which enhances the user's sense of motion. The side monitors may also be employed for biomechanical data and/or status displays.

Referring back to FIG. 2A, a user operates the apparatus 22 by pedaling the cycling pedals 27 and steering with the handles 30 to freely navigate through the simulated environment. The computer 32 can vary the pedal resistance felt by the user by controlling the pedal resistance device 28. The computer 32 monitors pedal speed and steering direction to determine the user's position in the simulated environment. Based on the user's action, the computer 32 provides the monitor 35 with updated views of the simulated environment which corresponds to the user's position. The monitor 35 provides the user with an ongoing visual display of the simulated environment based on the user's position therein as the user freely navigates in the environment.

The computer 32 is capable of running many different interactive programs to provide a variety of environments. Some programs provide roads, terrain and obstacles for the user. Other programs include underwater adventure, pedal powered flight simulators, and space travel. Each program provides a simulated environment which the user views through the television monitor 35. The user freely navigates in the environment using the pedals 27 and the steering handles 30. In other words, user travel in the simulated environment is substantially unrestricted. Thus, the user can travel across roads and trails or chose to travel across grass, water as well as other more challenging terrain.

Many existing exercise machines and video games have a start-up sequence which requires a user to enter certain facts, such as weight, skill level, desired course and length of workout. The information is usually gathered through a set of buttons with LED indicators. However, this type of interrogation can be confusing and time-consuming. Accordingly, the cycling apparatus 22 may gather some of this type of information indirectly. For example, a sensing device (69 in FIG. 5) can be incorporated into the seat 25 for automatically weighing a user. Other information may be gathered by means of the user navigating the cycle down the path of choice. For example, a person who desires a tough workout could head for a hilly path. Other choices may be indicated by road signs or other markers. By using this navigational metaphor, the user is able to make choices in a natural and intuitive manner. If the user misses a choice he or she can simply turn around.

The computer 32 may be adapted to participate in a communication network connecting several exercise devices. As such, multiple users can exercise in the same simulated environment. This feature stimulates impromptu races and competition among users. By allowing users to navigate freely around the same environment, they can engage in friendly touring or fierce competition on a spur of the moment basis.

Figure 3:
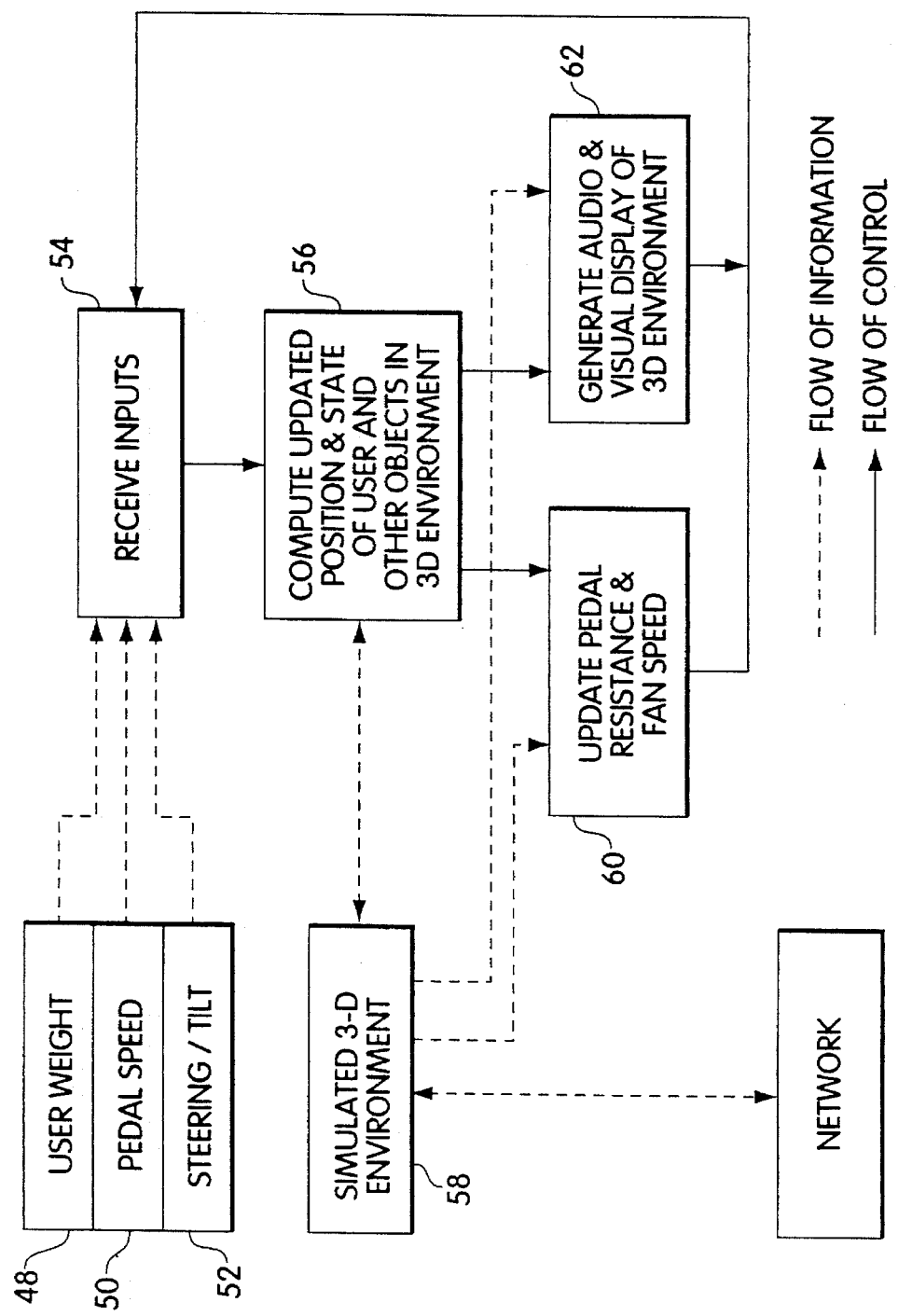
FIG. 3 is a flow chart illustrating one process for determining a user's position as the user freely navigates through a simulated environment.

A general process flow sequence of the interactive software within the computer 32 is shown in FIG. 3. Once a particular environment has been selected, the computer monitors a variety of parameters including user weight, pedal speed 50 and steering/tilt 52 (step 54). The computer uses these parameters to update the user's position and direction in the environment (step 56). Subsequently, the computer generates a visual (and optionally audio) image of the environment based on the updated position of the user (step 62). The monitor 35 displays updated images at least 7 times/second. The computer 32 updates pedal resistance to simulate such elements as hills, gear changes, road surfaces, simulated headwinds and drafting of opponents (step 60). The fan speed can be modulated to correspond to the simulated windspeed and speed of travel. Finally, the computer 32 may also generate sounds and background music.

Figure 4:
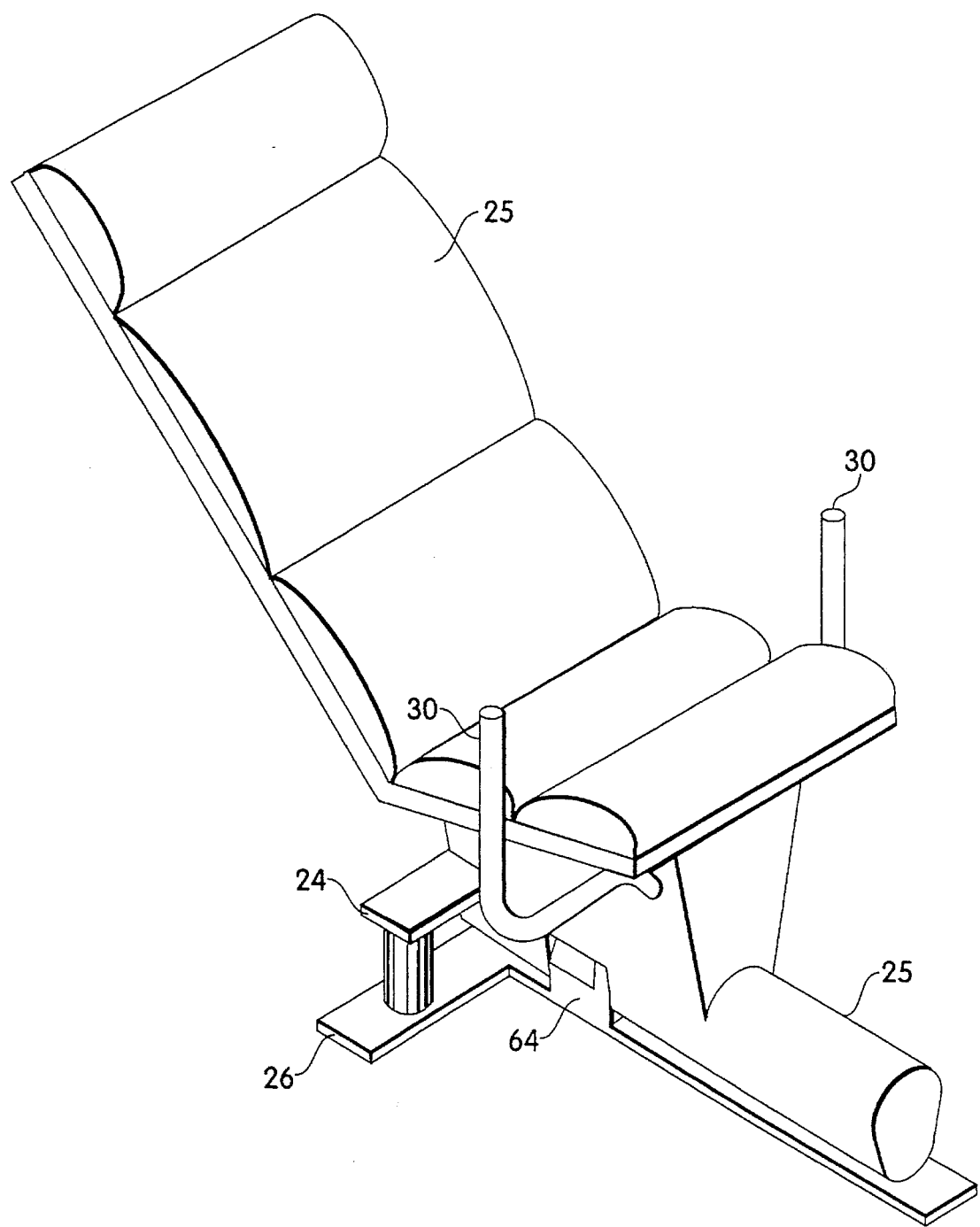
FIG. 4 is a partial perspective view of the interactive exercise cycle of FIG. 2A illustrating a frame movably mounted on a stationary base.

A detailed illustration of the seating portion of the exercise apparatus 22 is provided in FIG. 4. The seat 25 upon which the user sits is mounted onto the frame 24. The frame 24 is movably mounted to the base 26 by hinges 64. Although only one hinge 64 is shown, it is noted that one or more hinges are used. Push button controls can be provided on the handles 30 for shifting gears and other interactive functions.

Figure 5:
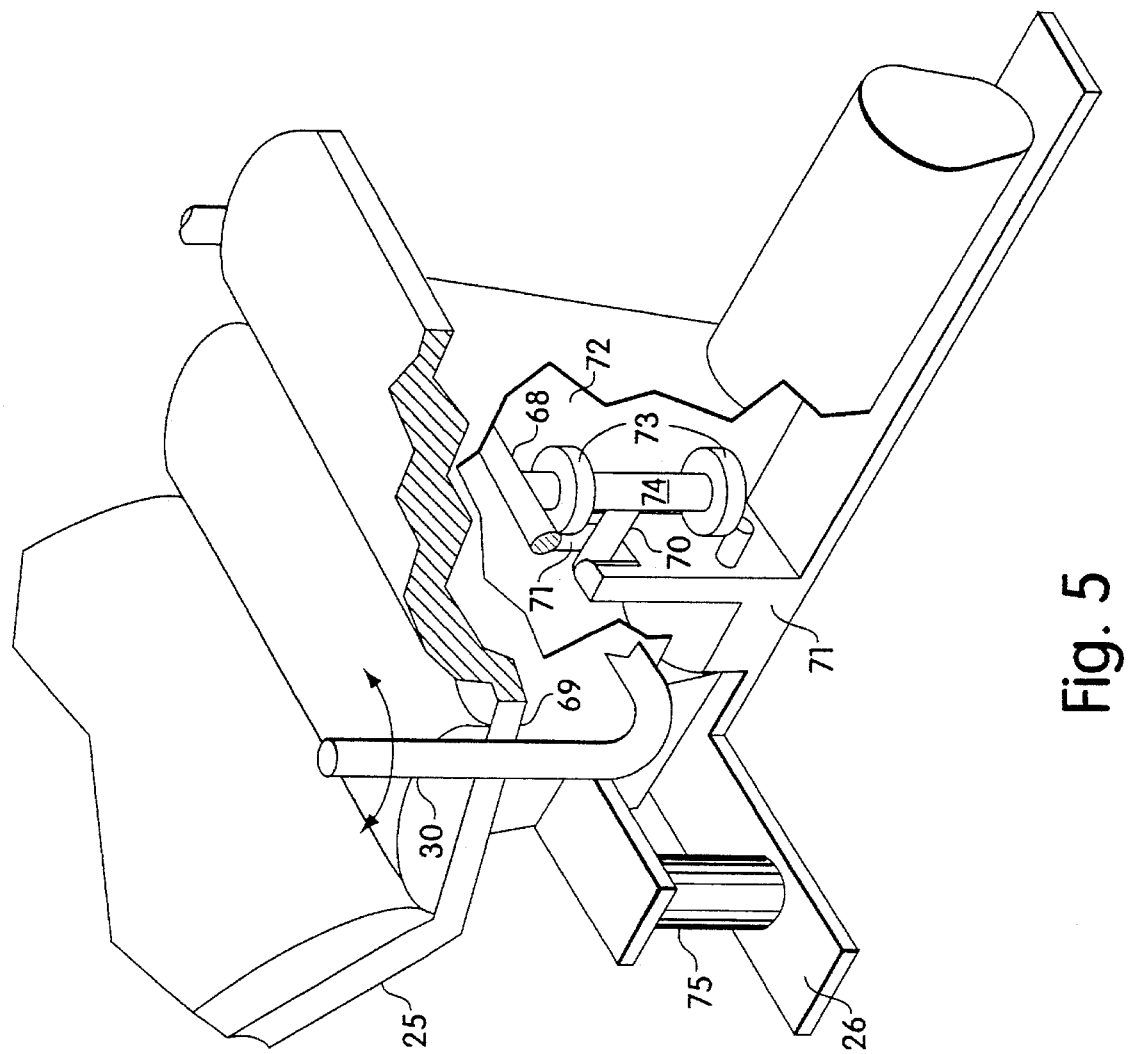
FIG. 5 is an exploded partially cut-away view of FIG. 4 illustrating a mechanical linkage connecting the steering mechanism to the base.

Referring to FIG. 5, a mechanical linkage 72 allows the frame 24 to tilt relative to the base (up to 15 degrees or more to either side of the longitudinal vertical plane) in response to manipulation of the handles 30 for simulating the turning action of a bicycle. The handles 30 are connected to the mechanical linkage 72 by a beam 68. The mechanical linkage 72 includes a horizontal beam 70 positioned between a pair of vertical posts 71. The posts 71 extend from the stationary base 26. The mechanical linkage also includes bearings 73 mounted in the frame 24 and holding a pivoting vertical post 74.

As the user manipulates the handles 30 back and forth (as indicated by the arrows) to steer in the simulated environment, the beam 68 turns causing the vertical and horizontal posts (74, 70) to move in the same direction laterally. The horizontal post 70 contacts the vertical post 71 which pushes the frame 24 in the opposite direction. This causes frame 24 to tilt about the hinge 64 causing the seat 25 and the pedals 27 to tilt accordingly.

A pair of springs 75 are positioned on opposite sides of the seat 25. The springs 75 are disposed between the frame 24 and the base 26 for centering the frame 24 once the user lets up on the handles 30 or gets off the seat 25. As such, the springs 75 serve as a self-centering mechanism to ensure that the seat 25 is vertically aligned for easy mounting and dismounting.

A sensing device 69 located under the seat 25 measures the users weight and adjusts the stiffness of the self-centering springs 75. The springs 75 are adjusted to stiffer settings for heavier persons and less stiff settings for lighter persons. As such, each user can experience the full range of tilting motion.

Additional sensors may be employed in and around the seat 25 to noninvasively monitor the user's heart rate, pedal speed and power output. For example, the sensing device 69 provides an estimate of the users body weight. These inputs are used by the computer software to determine the caloric output of the user.

It is noted that the apparatus of the present invention can employ a traditional freewheel and flywheel to provide pedaling resistance. However, a closed loop digital control system may be employed instead. As such, pedaling resistance would be provided by a simpler drive mechanism controlled electronically by a digital control system to provide for smooth pedaling strokes.

Figure 6:
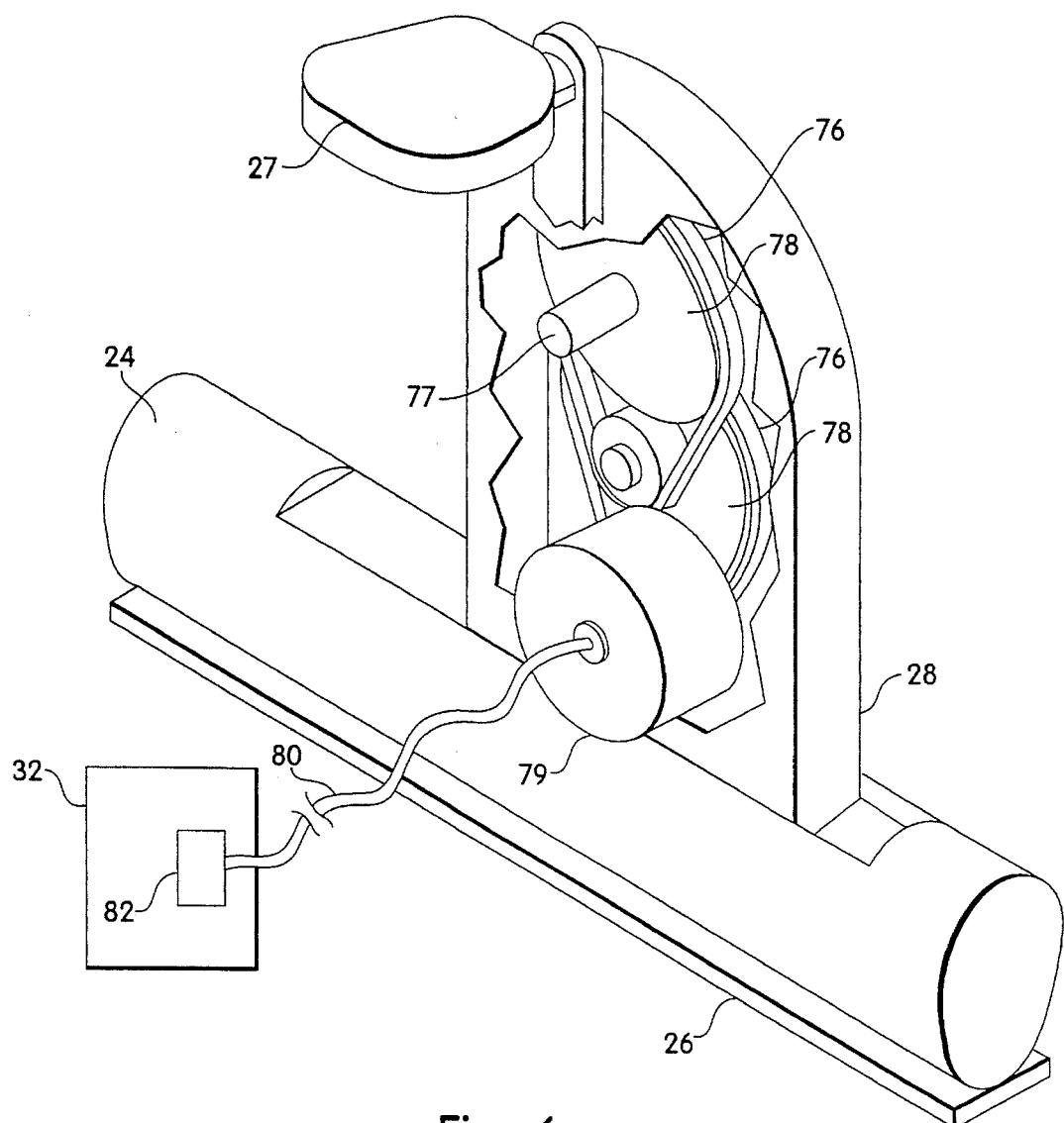
FIG. 6 is a cross-section view of a pedal resistance device used in the interactive exercise cycle of FIG. 2A.

Referring to FIG. 6, the cycling pedals 27 are connected to the pedal resistance device 28. The device 28 is adjustable to accommodate users having short and long legs. The pedals 27 turn an axle 77. The axle 77 is coupled to a braking device 79 by a plurality of belts 76 and pulleys 78. The braking device 79 can include any of the following mechanisms: a magnetic particle brake, hysteresis brake, mechanical straps and pads, electrical generators, torque motors or magnetic inductance. In one embodiment, a hysteresis brake is used (such as Model HB produced by Magtrol, Inc. Buffalo, N.Y.) providing a smaller, simpler means of providing the resistance to the pedals.

The digital control system 82 is connected to the brake 79 by wires 80. Responsive to the interactive software in the computer 32, the control system 82 controls the pedal resistance of the braking device 79 electronically, thereby emulating the traditional flywheel/freewheel arrangement to provide the proper combination of pedal resistance and inertia for smooth pedaling revolutions. For example, an extremely light resistance is provided to simulate downhill travel and higher resistance is provided to simulate gear changes, wind resistance and hills. The pedals can be driven backwards to reverse direction.

Equivalents

While the invention has been particularly shown and described with reference to specific preferred embodiments, it should be understood by those skilled in the art that various changes in form and detail may be made therein without departing from the spirit and scope of the invention as defined by the appended claims.

We claim:

1. An exercise apparatus comprising:

a support structure for supporting a user;

an exercise mechanism for providing exercise to the user supported by the support structure;

a steering mechanism proximal to the support structure;

a processor for generating an interactive simulated environment and monitoring user manipulation of the exercise mechanism and the steering mechanism to determine user position in the simulated environment; and a display system spaced from the user and providing a visual display of the simulated environment and user position in the simulated environment;

the processor being configured to enable the user to (i)

travel substantially unrestricted throughout the simulated environment by manipulating the exercise mechanism and the steering mechanism, (ii) spontaneously modify user's course while traveling within the simulated environment, and (iii) participate in user selectable activities within the simulated environment.

2. The exercise apparatus of claim 1 further comprising a mechanical linkage coupling the steering mechanism to a stationary base such that (i) the steering mechanism is operably independent of the exercise mechanism, and (ii) user manipulation of the steering mechanism causes tilting of the support structure and exercise mechanism about a longitudinal vertical plane extending through the base.

3. The exercise apparatus of claim 2 wherein the mechanical linkage allows for tilting in the forward, backward and lateral directions.

4. The exercise apparatus of claim 1 further comprising one or more springs coupling the support structure to a stationary base for self-centering the steering mechanism.

5. The exercise apparatus of claim 1 wherein the exercise mechanism comprises a pair of cycling pedals.

6. The exercise apparatus of claim 5 wherein the means for exercise mechanism further comprises a closed loop digital control system which emulates a flywheel and freewheel to provide pedal resistance and inertia for smooth motion.

7. The exercise apparatus of claim 1 wherein the computer is connectable to a computer of another exercise apparatus to allow for group participation in the freely navigable simulated environment.

8. The exercise apparatus of claim 1 wherein the support structure comprises a viewing screen.

9. The exercise apparatus of claim 1 wherein the display system comprises multiple viewing screens positioned to provide a wider field of view of the simulated environment.

10. The exercise apparatus of claim 9 wherein each viewing screen is a television monitor.

11. The exercise apparatus of claim 1 further comprising a fan controlled by the processor for simulating wind speed.

12. An exercise cycle comprising:

a support structure for supporting a user;

a means for providing user-initiated aerobic exercise to the user supported by the support structure;

a steering mechanism proximal to the support structure;

a mechanical linkage coupling the steering mechanism to a stationary base such that (i) the steering mechanism is operably independent of the exercise mechanism, and (ii) user manipulation of the steering mechanism causes tilting of the user supported by the support structure about a longitudinal vertical plane extending through the base;

a processor for generating an interactive simulated environment and monitoring user manipulation of the exercise mechanism and the steering mechanism to determine user position in the simulated environment; and a display system spaced from the user and providing a visual display of user position in the simulated environment;

the processor being configured to enable the user to (i) travel substantially unrestricted throughout the simulated environment by manipulating the exercise mechanism and the steering mechanism, (ii) spontaneously modify user's course while traveling within the simulated environment, and (iii) participate in user selectable activities within the simulated environment.

* * * * *